J. W. CALHOUN.
WATER METER CONNECTION AND VALVE.
APPLICATION FILED SEPT. 22, 1917.
1,300,925.
Patented Apr. 15, 1919.
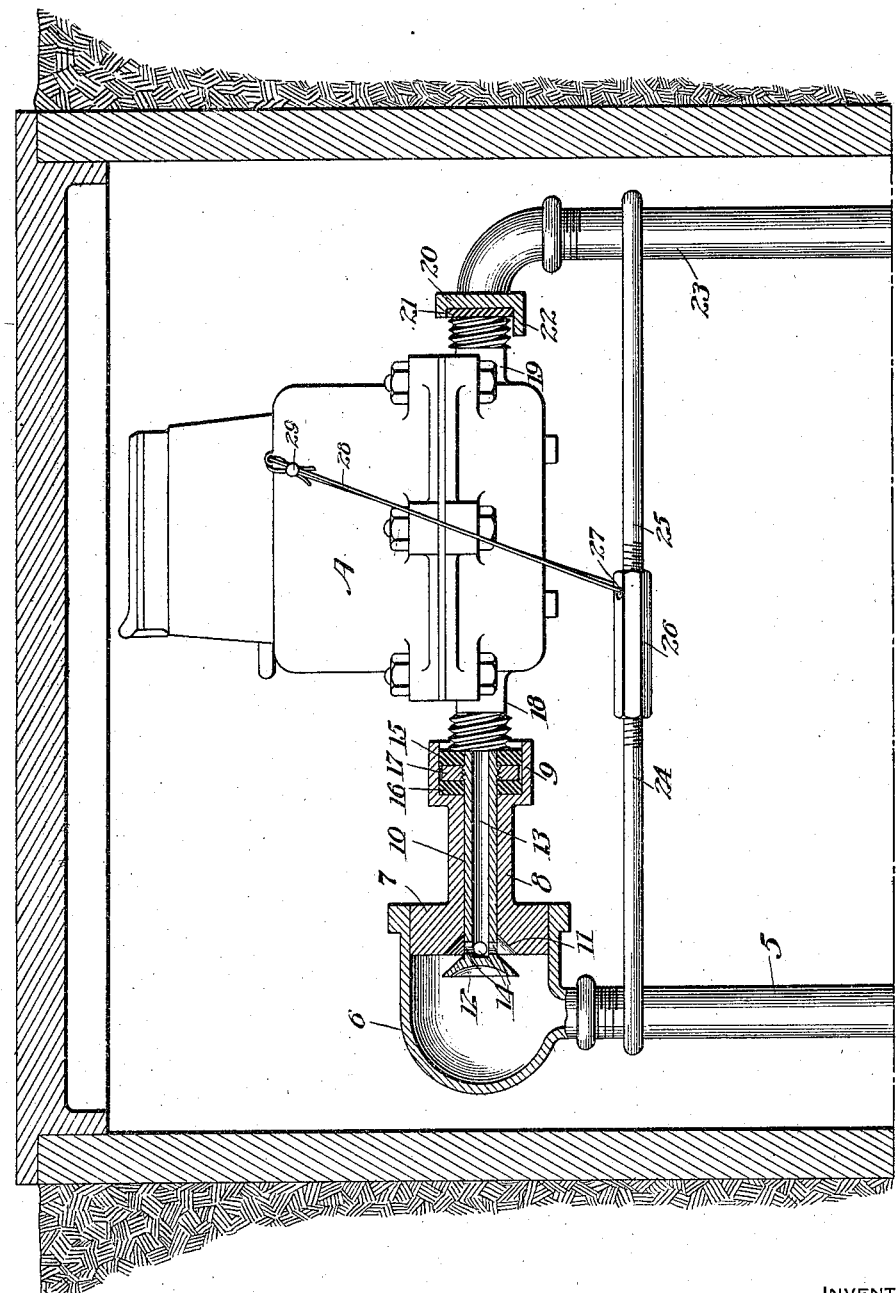
WITNESSES
R. E. Rousseau
H. G. Pierson
INVENTOR
J. W. Calhoun,
BY Victor J. Evans
ATTORNEY

UNITED STATES PATENT OFFICE.

JOHN W. CALHOUN, OF PITTSBURGH, PENNSYLVANIA.

WATER-METER CONNECTION AND VALVE.

1,300,925.　　　　Specification of Letters Patent.　　Patented Apr. 15, 1919.

Application filed September 22, 1917. Serial No. 192,763.

*To all whom it may concern:*

Be it known that I, JOHN W. CALHOUN, a citizen of the United States, residing at Pittsburgh, in the county of Allegheny and State of Pennsylvania, have invented new and useful Improvements in Water-Meter Connections and Valves, of which the following is a specification.

This invention is a water meter connection and valve.

One object of this invention is to provide a connection so that the meter may be readily disconnected from and connected to the service pipes.

Another object is to provide a connection so that when the meter is disconnected and removed from the service pipe the flow of fluid will be automatically stopped and controlled.

A further object is to provide a valve with a stem having an opening therethrough connected with suitable openings adjacent the valve head disposed in the inlet service pipes so formed that the stem will coöperate with a spud of the meter to actuate the valve.

A still further object is to provide a method of sealing the meter in place to prevent tampering.

With the usual type of water meter connections used, when it is desired to remove the meter, the flow of water through the service pipes must be cut off at the street through the ordinary cock which controls the flow of water from the street service pipe to the house service pipe.

Sometimes it is desired simply to remove the meter temporarily to make a slight adjustment or to reset it, and with the usual mode of construction, the operations just outlined must be performed. With this device the meter may be readily removed and replaced without touching or actuating the service cock in any way.

To accomplish these various objects, the invention, broadly stated, comprises in connection with the usual service pipes and a meter having spuds formed thereon, a bearing on the house service pipe provided with a gasket to coöperate with one of the spuds and the street service pipe, a valve body secured thereto which has disposed therein a tubular valve stem having openings therethrough communicating adjacent the conical valve head with suitable openings to permit the water to pass around the valve head and through the stem, a head for the valve, and a disk interposed between the washer and gaskets carried on one end of the valve stem and adapted to move within a suitable bearing formed as a part of the valve body, the washer and gaskets and disk being adapted to contact and coöperate with another spud to actuate said valve stem and head, and means to maintain the spuds in coöperative engagement with the bearing portions extending between the service pipes, said means including an adjustable device and an opening through which may pass a sealing wire.

One practical form of the construction will be described and illustrated in the accompanying drawing, in which:—

The figure shows the interior of a meter box, the salient features of the invention being shown in section.

In the preferred embodiment shown, the street service pipe 5 carries at its upper end the valve body 6. As shown, this valve body is provided with an opening at substantially right angles to its connection with the street service pipe 5. Disposed within this opening is a guide member having an enlarged head 7 which is adapted to coöperate with the valve body, and is secured thereto in any suitable manner. Extending from the head 7 is a cylindrical portion 8 which terminates in an enlarged bearing end 9.

The head 7 and the cylindrical portion 8 have a passage therethrough indicated at 10. At the inner end adjacent the head 7 there is formed a valve seat 11, which is substantially conical shaped. To coöperate with this valve seat there is a valve head 12, which is secured to a tubular valve stem 13. Adjacent the under side of the head 12, there are formed suitable openings 14, which communicate with the interior of the valve stem 13, and when the valve head 12 is lifted from its seat permit water to flow through the valve stem to a water meter, indicated at A.

The other end of the valve stem 13 where it projects into the bearing portion 9 is provided with suitable gaskets indicated at 15 and 16 between which there is interposed a nut 17. These gaskets and nut may be secured to the stem in any usual or customary manner. The spud 18, which is formed upon the meter A, is adapted to be brought into engagement with the gasket 15 and with it forms a water-tight seal. The diameter of the bearing portion 9 is such that the gaskets 15 and 16 will move therein and yet form a water-tight seal and a bearing so that when the valve stem 13 is moved no water will leak around them.

The spud 19 is adapted to coöperate with a bearing 20, which carries a gasket 21. This bearing 20 is provided with a short shoulder indicated at 22. The whole bearing 20, the shoulder and gasket, are carried by the house service pipe 23. The gasket 21 forms a water-tight joint.

Extending between the street service pipe and the house service pipe 23 there is an adjustable connection indicated by the threaded members 24 and 25. The threads formed between these members are preferably right and left handed, respectively, and to coöperate with these threaded portions there is a turn buckle 26. The turn buckle 26 is provided at a suitable point, as indicated at 27, with a small hole or opening therethrough, so as to permit the passing therethrough of a sealing wire 28, which may be secured to the water meter with the usual lead seal, as indicated at 29.

The threaded members 24 and 25 serve to draw the house and street service pipes by means of the bearings 9 and 20 into firm engagement with the spuds 18 and 19 formed on the meter box. Thus a water-tight joint is effected that also serves the purpose of maintaining the meter in its correct position.

When it is desired to disconnect and remove the meter for repairs or replacement, the turn buckle 26 is rotated in such a manner that the threaded members 25 and 24 will permit the street service pipe 5 and the house service pipe 23 to be separated. The act of separating relieves the pressure from the gaskets 15 and 16 and the interposed washer or disk 17, and the pressure of water upon the valve head 12 tends to force the head into engagement with its seat and thus shut off and control the flow of water through the valve stem, 13. This movement of the stem 13 and its head 12 is automatic upon the relieving of the pressure by the spuds upon the gaskets 15 and 16. A continued movement of the turn buckle 26 will permit the pipes to be separated a sufficient distance so that the meter A may be readily removed.

It will be seen from the foregoing description that there is no necessity for shutting off the water by the street cock preliminary to the removal of the meter A except at such times as it is desired to remove the meter permanently.

Minor changes in the form, proportions, and details of construction may be resorted to without departing from the spirit of the invention or the scope of the appended claim.

What is claimed is:—

A device of the class described comprising an inlet pipe having a portion provided with an enlarged outer end forming a packing chamber and a valve seat at its front end, a one piece valve, in said portion consisting of a tubular stem passing through said portion and having an enlarged head at one end engaging the valve seat and its other end being screw threaded and extending into the chamber, packing means secured to the screw threaded end of said stem and movable within the packing chamber and a water meter having a spud thereon engaging with said packing means and holding the valve off its seat, said stem being held to the seat by the water pressure when the spud is removed.

In testimony whereof I affix my signature.

JOHN W. CALHOUN.

Copies of this patent may be obtained for five cents each, by addressing the "Commissioner of Patents, Washington, D. C."